March 21, 1950 W. B. JOHNSON Re. 23,210

THREAD CUTTER

Original Filed May 19, 1943

INVENTOR.
William B. Johnson
BY
Watson D. Haubaugh
HIS ATTORNEY

Reissued Mar. 21, 1950

Re. 23,210

UNITED STATES PATENT OFFICE 23,210

THREAD CUTTER

William B. Johnson, Wheaton, Ill.

Original No. 2,379,908, dated July 10, 1945, Serial No. 487,591, May 19, 1943. Application for reissue September 2, 1949, Serial No. 113,851

16 Claims. (Cl. 10—118)

Matter enclosed in heavy brackets [ ] appears in the original patent but forms no part of this reissue specification; matter printed in italics indicates the additions made by reissue

The present invention relates to an improved process and apparatus, such as a tap or die, for cutting threads upon a member made of a machinable material.

Threads are generally used to hold two elements together in a readily engageable and removable manner. One thread is formed externally upon one element or male member and a second thread is formed internally upon the other element or female member. These threads are helical ridges capable of nesting with each other, each ridge being received in the space between the spirals of the other ridge when the members are rotated with respect to each other in one direction and removable from nested position when rotated in the opposite direction.

The largest diameter of the thread is known as the major diameter, while the smallest diameter is known as the minor diameter.

The snugness with which the ridges on the two joined elements nest is called the fit and five distinct classes of fits have been established for the purpose of insuring the interchangeable manufacture of screw thread parts throughout the country. A "class one" fit is a loose fit. A "class two" fit is a free fit. "Class three" is a medium fit. "Class four" is a close fit, while "class five" is a wrench fit.

To insure this interchangeability of screw thread parts, there is an intentional difference provided in the dimensions of the mating parts, which difference is called "allowance." This relates to the minimum clearance permitted and represents the tightest permissible fit, i. e. the fit permitted between the largest expected male member mated with the smallest expected female member. In order to control what is to be expected regarding maximum and minimum sizes, a "tolerance" criterion is set up to determine the amount of variation permitted in the size of each of the two parts.

Whether or not the rated class fit is maintained is a question then of allowance and the smoothness of the finish upon the surfaces of ridges which contact each other. If this finish is rough, a higher class fit is sacrificed because allowance must be sacrificed to enable the threads to mate in spite of the roughness. The smoother the finish, the closer the allowance can be held and still have the parts mate, and thereby the higher is the class fit that can be attained.

Threads are generally cut by taps or dies, depending upon whether the thread is an internal thread or an external thread, respectively. A tap is usually a cylindrical bar of steel with one or more threads formed around it, and with grooves or flutes cut lengthwise in it to intersect the threads and thereby form cutting edges at the leading edges of the interrupted threads which cut an internal ridge or thread. A die is usually a flat piece of steel internally threaded and provided with grooves or flutes intersecting the threads to form cutting edges which cut an external thread. Those portions which remain between the flutes are called the lands.

In order to spread the cutting load over more than those cutting edges which are present in one turn of the thread, the starting end of the tap or die has its thread turns chamfered to provide a lead which divides the total cutting load between the number of cutting edges in a turn multiplied by the number of thread turns affected by the chamfer. With this arrangement, each cutting edge cuts a portion of the total material from the member being threaded until the depth of the engagement covers the chamfered portion. For instance, if the chamfer covers three turns, the cutting edges present in these three turns do not complete the thread they are cutting until the tap or die is rotated three turns with respect to the member being threaded. Furthermore, if there are four cutting edges per turn, there are four cutting edges for each of the three turns over which the cutting load is distributed, namely, twelve cutting edges.

The flutes in the tap not only provide cutting edges, and a passage for the lubricant to flow to the cutting edges, but also clearance for the removal of chips made by the cutting edges. In order to have as large flutes as possible for maximum clearance the flutes conventionally are spaced at equal distances around the thread.

In cutting threads upon a machinable material, the character of the metal has much to do with the finish, the allowance, and the tolerances that can be maintained, and, therefore, through these the class fit possible to attain. A stringy material such as aluminum and thermo handled plastics or high alloy metals such as S. A. E. 4140 or cold rolled steel present many problems along these lines. Ductility, hardness and temper which provides a material of such a character as to incur packing, ripping, or tearing when being machined, results in scored and roughened wall finish.

Furthermore, as the cutting edges cut into the body of the member being threaded there are variations encountered in the grain or material of the member and also discrepancies between the alignment and feed of the member and the tap or die. This causes the top or die to hunt to an extent sufficient for the cutting edges to dig deeper in some places than in others, particularly if the material is a stringy or ductile material. In addition to this, irregularities caused by preceding cutting edges affect the operation of following edges.

All of this affects tolerances and through this the class fit derivable. The class fit is the summation of all the factors involved and, therefore, the greater are the difficulties of attaining perfection when all factors require improvement, and control.

Many times a cutting edge is broken or fractured if it cuts deeper or hits a hard spot, and the torque effort flexes the tap enough to permit a very heavy load to be concentrated upon a limited number of cutting edges. This not only affects the quality of the thread adversely, but also the life of the cutting edges. Often the taps or cutting edges snap off or are spoiled beyond repair.

In event the class fit is not up to that required, due to any one or more of the above factors, extra steps have to be taken to further finish the thread as by grinding or using a second or finishing tap or die. These extra steps consume time and require extra equipment.

The present invention eliminates these difficulties and provides a thread having a smoother wall and one which can be held to closer tolerances. Not only this, but a further object of the invention is to provide a stronger tap or die, and one which will have an improved life.

These being among the objects of the present invention, other and further objects will be apparent from the drawing, the description relating thereto, and the appended claims.

Referring now to the drawing.

Figure 1:
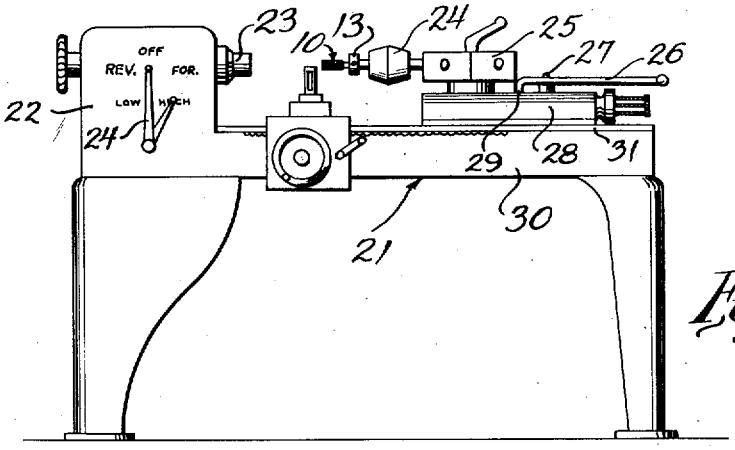
Fig. 1 is a side elevation of a lathe equipped with a tap embodying the invention.
Figure 2:
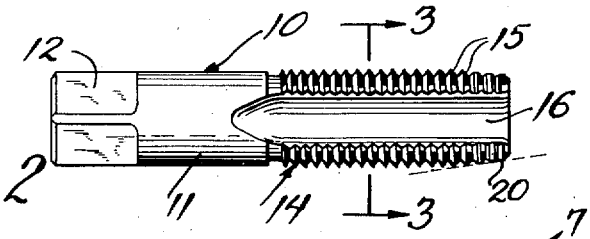
Fig. 2 is a side elevation of the tap shown upon the lathe in Fig. 1.
Figure 3:
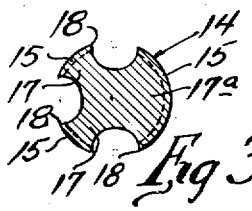
Fig. 3 is a section taken upon line 3—3 in Fig. 2.

In the practice of the invention, it is preferred to provide three or more cutting edges and lands which successively cut and contact a workpiece respectively in a predetermined spaced order in which some of the cutting edges are followed by short lands and one cutting edge is followed by a land wide enough to contact the workpiece over an area approximately one-fourth of the periphery of the cut.

In event the cutting load is to be distributed to cutting edges in more than one turn of the thread, the first several turns are chamfered and the thread so arranged that the order of cutting edges in the first turn is repeated for successive turns in which preferably the cutting edge upon the wide land is the last to cut and engage the work, thereby following equally spaced cutting edges on the narrow lands. The cutting edges on the narrow lands in the second turn of the thread and the second cutting edge on the wide land follow in that order, etc., to the third, fourth and fifth cutting edges of the respective turns, depending upon the number of turns of the threads which are chamfered.

The cutting edges cut along a helical path and the wide land preferably contacts the workpiece over an arc of substantially 90° or more of one turn of the helical path.

The cutting edges upon the remaining lands and the lands themselves are preferably balanced as much as is practical upon opposite sides of a diametral line bisecting the arc just mentioned for the wide land.

The relationship between the wide and narrow lands regarding area is preferably determined as near as possible by the following criteria, namely, that the wide land should be less than the total area of the narrow lands.

With this arrangement there is good torsional balance without unbalanced drag and the cutting load is substantially balanced on both sides and opposite of the wide land so that the wide land serves as a built-in lead thread and steady rest for the other cutting edges. Furthermore, the wide land supplies a burnishing action for the preceding cuts in each turn as the threads are being cut.

The steady rest effect of the wide land prevents the other cutting edges gouging the work and weaving radially. The lead effect of the threads upon the wide land directs the cutting edges to cut true on a helical path and prevents weaving axially. Furthermore, the stock of the wide land rigidifies the tap or die against deflections that would otherwise cock or displace the other cutting edges and provides them with a torsional support which is radial to the cutting edges as well as longitudinally of the narrow lands.

The relationship of areas just mentioned is of interest on this point also because as each land is cut away in sharpening the edges, the narrow lands are each made narrower as much as the wide land. The relationship regarding total areas changes since the total cut away from the narrow lands is greater than that cut from the wide land during the expected life of the tool. However, with the narrow lands becoming narrower and narrower with sharpening, their tendency to dig and hunt independently is increased and the relative increased area of the wide land serves more and more as a steady-rest to counteract the increasing tendency of the narrowing lands to dig and hunt.

The burnishing action provided by the wide land removes slight irregularities that might occur in one revolution and thereby prevents the pyramiding of such irregularities as far as subsequent cutting edges are concerned.

These results not only provide an improved thread so that a higher class fit can be attained, but also increase tool life for the taps and dies themselves a great deal.

Having thus described the process of the invention, the invention is characterized by a tap or die construction having three or more cutting edges and lands in which one of the lands occupies approximately 90° of the circumference of the tap or die and the remaining lands are disposed at substantially equal intervals over the remainder of the circumference.

As more particularly shown in the drawing, a tap 10 having a shank 11 squared at 12 to be received in a holder 13 (Fig. 1) has a body portion 14 provided with a helical thread 15. Flutes 16 are cut longitudinally along the body portion crosswise the threads and deep enough to section the threads upon lands 17 to provide cutting edges 18 upon the leading edges of the thread sections.

One of the lands 17a is of sufficient peripheral expanse between adjacent flutes to occupy an arc of approximately 90°. It is preferred that this arc be very little less than 90°, if any, and a little more than 90° if convenient in the design. Furthermore, it is preferred that the area of the wide land not exceed the total area of the narrow lands. Thus, as the cutting edges are dulled in use and resharpened back into the land 17a, approximately 90° of land will preferably exist throughout the life of the tap, the amount to which the wide land will be cut away in sharpening being determined by the amount of sharpening the narrow lands will permit.

The cutting end of the tap 10 is chamfered as at 20 to provide a lead of several thread turns and the first cutting edge is located preferably upon the narrow land following the wide land 17a.

The narrow lands may be chamfered and radially relieved in the usual manner but the chamfer angle upon the wide land is carried through on the lead of the thread throughout the width of the wide land so that the cross sectional contour of a chamfered thread on the wide land is constant throughout its length. This is accomplished by determining the chamfer angle between the top and a grinding wheel, starting the grinding cut at the cutting edge and leading the tap into the wheel by the lead of the thread being ground. Thus, the thread on the wide land following its cutting edge is of the same dimension throughout its length to ride solidly in the groove the cutting edges of the tap have made up to that turn.

With this construction, the wide land serves as a lead thread for the next turns, being circumferentially wide enough so as not to be affected by irregularities caused by the preceding cutting edges, and serving as a steady rest for the tap and the remaining cutting edges which follow, as already mentioned. Then, as the cut proceeds, the wide land serves in its own cut to burnish the completed threads so that the steady-rest effect is firmly supported and chatter or lateral yield at any cutting edge is greatly reduced.

Furthermore, the increased stock provides the tap with a greater structural rigidity under torque strains. The resulting thread is one which can be rated one or more class fits higher than that provided with a conventional tap.

The tap may be supported in any one of a number of machines for use. In Fig. 1, by way of example, a turret lathe 21 is provided with a head 22 for supporting and rotating a workpiece 23. The workpiece can be rotated in either direction, depending upon the position of the control handle 24.

The tap 10 is secured in the holder 13 that is supported upon a releasing tap or die holder 24, being provided with a clutch mechanism (not shown) which supports the tap against rotation until a certain depth is reached, at which point the clutch releases the tap to turn with the workpiece unil the direction of rotation thereof is reversed. When rotation is reversed, the clutch, being a one way clutch, prevents rotation of the tap and the tap removes itself from the workpiece as by unthreading.

The releasing holder 24 is mounted upon the turret 25 at one of the stations, the others of which may be used to support other tools needed in processing the workpiece 23.

The turret 24, and thereby the tap 10 is advanced and retracted by the control pivoted as at 27 to the turret bed 28 and as at 29 to the lathe bed 30, the turret bed riding on slideways 31 upon the lathe bed.

Figure 4:
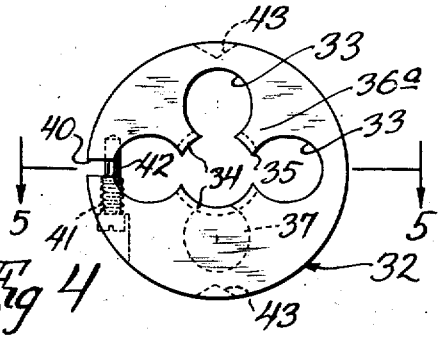
Fig. 4 is a top view of a die embodying the invention.
Figure 6:
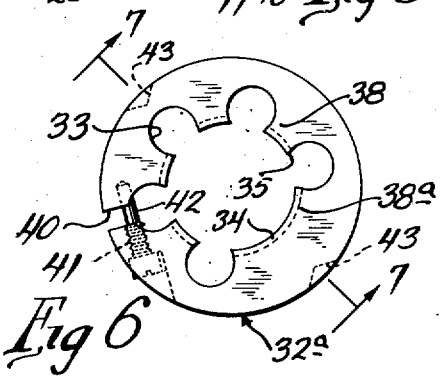
Fig. 6 is a top view of another die embodying the invention.
Figure 7:
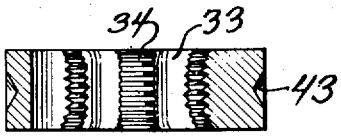
Fig. 7 is a section taken upon line 7—7 in Fig. 6.
Figure 5:
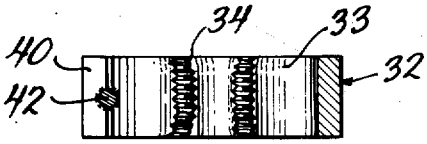
Fig. 5 is a section taken upon line 5—5 in Fig. 4.

The principle applies also to dies, reference being made to Figs. 4 and 6 where in Fig. 4 flutes 33 are made crosswise of the thread 34 to provide cutting edges 35 upon lands 36 with a wide land 36a occupying approximately 90° of one turn of the thread upon dies 32 and 32a. In fact, the operation of a conventional die can be greatly improved if an insert, such as that represented diagrammatically at 37 is introduced into one of the flutes, if the die shown in Fig. 4 otherwise was conventionally constructed provided the total land area of the wide land thus provided is approximately 90°.

In Fig. 6 is shown a die 32a having a construction wherein five cutting edges are provided with four narrow lands 38 spaced at equal distances in the arc not occupied by the wide land 38a. Otherwise, the dies shown in Figs. 4 and 6 are split as at 40 and threaded as at 41 to receive an adjusting screw 42 to determine the diameter of the thread to be cut, and the dies are provided with locking depressions 43 to support the dies in suitable die holders (not shown) that can be received by the holder 24 for use in a way similar to that described in connection with the tap.

The size of the tap or die is immaterial so long as the relationships discussed are maintained, the additional advantage existing with the larger sizes of more cutting edges being available. In fact, the design shown in Fig. 6 illustrates the arrangement and number of cutting edges that is preferred for a die which is next in size to the die shown in Fig. 4.

Furthermore, the principles set forth herein and discussed apply to taps or dies with spiral flutes and tap and dies designed to cut taper or pipe threads and the claims are to be so construed if not otherwise limited.

Having thus described the process and the preferred embodiments of the invention for threading a machinable material, it will be apparent from the description how the objects and purposes of the invention are accomplished. However, since in some respects it is not possible to account fully for the improved results which are obtained by the method and apparatus of this invention, it should be understood that any attempt to analyze the theory which is believed to be responsible for these results is to be construed not as defning a mode of operation but merely as a possible explanation of certain physical and metallurgical phenomena which have been observed.

Consequently, although certain preferred embodiments of the invention have been shown and described herein, it will be apparent to those skilled in the art that various uses, modifications and changes can be made without departing from the spirit and substance of the invention, the scope of which is commensurate with the appended claims.

What is claimed is:

1. A thread cutter for a machinable material comprising a *unitary* member having a thread cutting edge followed by [a] *an integral* land [occupying] *extending* approximately 90° of a circle and a plurality of relatively narrow lands spaced at substantially equal intervals over the remainder of the circle by longitudinal flutes separating the lands and forming cutting edges thereon.

2. A thread cutter for a machinable material comprising a *unitary* member having a thread cutting edge followed by [a] *an integral* wide land *having uninterrupted thread elements thereon extending from one side to the other side of the land* for contacting a workpiece over an area in excess of approximately 90° of a circle, and a plurality of relatively narrow lands spaced at substantially equal intervals over the remainder of the circle by longitudinal flutes forming cutting edges thereon.

3. A button die having one *unitary* land in excess of approximately 90° of a circle in width *with a plurality of threads thereon uninterrupted from one side of the land to the other*, and a plurality of other relatively narrow lands spaced at equal distances over the remainder of the circle by longitudinal flutes forming cutting edges thereon.

4. A thread cutter including a plurality of equally spaced, relatively narrow threaded cutter lands and another *unitary* land *formed integrally with the cutter* occupying substantially 90° of arc, said lands being separated by longitudinal flutes which provide undercut edges for the leading edges of the cutting lands.

5. A thread cutter for a machinable material comprising a *unitary* member provided with a thread thereon sectioned into a wide land *whose thread portion is uninterrupted from one side of the wide land to the other side* and a plurality of relatively narrow lands by longitudinally disposed flutes deeper than the thread and forming cutting edges on the leading edge of each land, said wide land occupying approximately a 90° arc of one turn of the thread and the narrow lands being angularly spaced with respect to each other in the remaining portion of the thread turn.

6. A thread cutter for a machinable material comprising a *unitary* member provided with a thread thereon divided by substantially identical longitudinal flutes into a plurality of *integral* lands in excess of two, one only of which occupies substantially a 90° arc of one turn of the thread, said flutes forming the cutting edges on the lands.

7. A thread cutter for a machinable material comprising a member provided with a thread thereon sectioned into a plurality of relatively narrow equally spaced lands and a wide land by longitudinal flutes which separate the lands and form cutting edges thereon, said wide land following the last of said narrow lands in the cutting sequence and occupying substantially a 90° arc of one turn of the thread.

8. A thread cutter including a plurality of relatively narrow relieved lands equally spaced by longitudinal flutes forming cutting edges thereon and a wide land occupying substantially 90° of arc and having *uninterrupted* threads thereon of substantially constant cross-sectional size throughout their length.

9. A tap characterized by *a unitary integrally formed body having* a plurality of relatively narrow equally spaced lands and a wide land of approximately 90°, said lands being provided with threads and being separated by flutes forming cutting edges on the leading edges of the lands.

10. A thread cutting die characterized by a plurality of relatively narrow equally spaced lands and a *unitary* wide land of approximately 90°, said lands being provided with *a plurality of uninterrupted* threads thereon and being separated by chip clearing flutes forming cutting edges on the leading edges of the lands.

11. A pipe thread cutter having a plurality of relatively narrow relieved lands equally spaced from one another, and a *unitary* land of approximately 90° arc having [a] *an uninterrupted* thread thereon of constant cross-sectional size throughout its length.

12. A thread cutter characterized by a plurality of relatively narrow circumferentially spaced lands bounded by flutes forming cutting edges thereon and chamfered and relieved for one of the narrow lands to start the cut, and a wide land occupying substantially 90° arc and chamfered to engage a workpiece after the cut is started.

13. A thread cutter characterized by a plurality of relatively narrow lands bounded by substantially identical flutes forming cutting edges thereon and chamfered for one of the lands to start the cut, and a wide land occupying substantially 90° arc and having threads thereon chamfered to substantially a constant cross-sectional size throughout their length to engage a workpiece after the cut is started.

14. A thread cutter including a plurality of equally spaced, relatively narrow threaded cutter lands and a relatively wide *integral* land, said lands being separated by longitudinal flutes which provide undercut edges for the leading edges of the lands, and said wide land occupying *as a unitary element* an arc approximately equal to the sum of the arcs of two adjacent narrow lands and the space between them.

15. A tap characterized by a plurality of relatively narrow equally spaced lands and a wide land, said lands being provided with threads and being separated by flutes forming cutting edges on the leading edges of the lands, and said wide land *comprising an integral unitary land* occupying an arc approximately equal to the sum of the arcs of two adjacent narrow lands and the space between them.

*16. A tap characterized by a plurality of relatively narrow equally spaced lands and a wide land, said lands being separated by flutes forming cutting edges on the leading edges of the lands and being provided with uninterrupted threads extending from one side to the other side of each land, and said wide land with its respective threads thereon occupying an arc approximately equal to the sum of the arcs of two adjacent narrow lands and the space between them.*

WILLIAM B. JOHNSON.

REFERENCES CITED

The following references are of record in the file of this patent or the original patent:

UNITED STATES PATENTS

| Number | Name | Date |
|---|---|---|
| 194,469 | Schaub | Aug. 21, 1877 |
| 310,777 | Bill | Jan. 13, 1885 |
| 1,395,198 | McFarlane et al. | Oct. 25, 1921 |
| 1,718,536 | Dalzen | June 25, 1929 |
| 1,748,962 | Smith | Mar. 4, 1930 |
| 2,166,369 | Petersen | July 18, 1939 |
| 2,202,236 | Stimson | May 28, 1940 |

FOREIGN PATENTS

| Number | Country | Date |
|---|---|---|
| 187,535 | Great Britain | Oct. 26, 1922 |
| 429,823 | Germany | June 3, 1926 |
| 540,731 | Germany | Dec. 29, 1931 |